DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 17

T896,010
EMULSIONS AND USES THEREOF

Wayne W. Lochmaier, 312 Hamilton Drive, Kingsport, Tenn. 37663

Filed Nov. 18, 1970, Ser. No. 90,811
Int. Cl. C09k *3/28*
U.S. Cl. 117—136
No Drawing. 20 Pages Specification

A process where an emulsion containing a flame retarder is applied to the surface of a polyester fiber and the fiber is subsequently heated to diffuse the flame retarder into the fiber. The emulsion consists essentially of:

(A) water, (B) an emulsifier system which is a positive and negative ion in dissociation equilibrium wherein:

(1) the positive ion is an alkali metal ion, or an ion corresponding to the structure

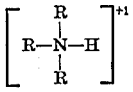

wherein R is H or an organic radical having from 1 to 20 carbon atoms, and (2) the negative ion is an ion corresponding to the structure

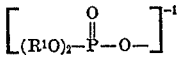

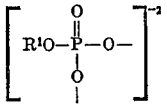

or

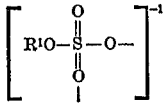

wherein $R^1$ is a monovalent aliphatic radical having 8 to 20 carbon atoms, and (C) based on the weight of (A), (B) and (C), from 50–90 weight percent of a flame retarder which can be (1) an aliphatic, alicyclic or aromatic compound of at least 6 carbons and containing from about 40–85 weight percent halogen, or (2) an aliphatic, alicyclic or aromatic phosphorus compound of at least 6 carbon atoms and containing from about 40–85 weight percent halogen, wherein the pH of the emulsion is in the range of 1–7, the viscosity of the emulsion is in the range of 2,000–50,000 centipoise, and the emulsion is stable for at least 100 days. The flame retarder can be tris(2,3-dibromopropyl)phosphate, bis(2 - bromoethyl) 2,5 - dibromophenyl phosphate, bis(bromochloropropyl) bromochloropropyl phosphonate, tris(dibromophenyl) phosphate, di(2,3-dibromopropyl) tribromophenyl phosphate, N,N′,N″ tris-(2,3-dibromopropyl) phosphoric triamide or

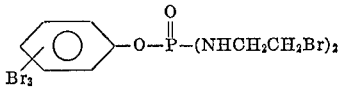

According to the process, the fiber is heated in a temperature range of about 175–220° C. for a sufficient time to cause a portion of the flame retarder to diffuse into the fiber structure. The fiber can be poly(ethylene terephthalate) or poly(1,4-cyclohexylenedimethylene terephthalate).